(12) United States Patent
Delepaut

(10) Patent No.: US 7,514,823 B2
(45) Date of Patent: Apr. 7, 2009

(54) SPACECRAFT REGULATION UNIT WITH DECENTRALIZED BUS CAPACITANCE

(75) Inventor: Christophe Jean Jeacques Delepaut, Dilbeek (BE)

(73) Assignee: Thales, Neuilly-sur-Seine (FR)

( * ) Notice: Subject to any disclaimer, the term of this patent is extended or adjusted under 35 U.S.C. 154(b) by 284 days.

(21) Appl. No.: 11/455,179

(22) Filed: Jun. 19, 2006

(65) Prior Publication Data

US 2006/0289964 A1  Dec. 28, 2006

(30) Foreign Application Priority Data

Jun. 22, 2005  (EP) ................................ 05291343.1

(51) Int. Cl.
*G05F 3/06* (2006.01)
(52) U.S. Cl. .................................................... 307/151
(58) Field of Classification Search ................. 307/151
See application file for complete search history.

(56) References Cited

U.S. PATENT DOCUMENTS 5,708,576 A * 1/1998 Jones et al. ............... 363/56.03
6,144,115 A   11/2000 Massie et al.

OTHER PUBLICATIONS

P. Perol, "Another look at the sequential switching shunt regulator", Proceedings of the European Space Power Conference, SN, SL, vol. 1, Sep. 21, 1998, pp. 79-84, XP009028861.

PCU Next-Generation Pre-development activities - Offer ref. 03029 - Vol. 1 - Technical Proposal - Nov. 29, 2004, pp. 1-30.

* cited by examiner

*Primary Examiner*—Robert L. Deberadinis
(74) *Attorney, Agent, or Firm*—Sughrue Mion, PLLC

(57) ABSTRACT

A Spacecraft Regulation Unit SRU or Power Conditioning Unit PCU with decentralized capacitance comprising several power conversion modules each coupled, via interconnection means, to a high-level power bus for supplying power to equipment of a satellite. Each power conversion module has a bus capacitor ($C_{mod}$) coupled via the interconnection means to the high-level power bus. The known common power bus capacitors bank is thereby replaced by the bus capacitors distributed within the different power conversion modules. This saves a specific power bus capacitors bank and allows the bus capacitance to grow with the number of paralleled power conversion modules, thereby yielding a bus impedance all the more lower that the power level is high. This also improves the SRU in term of mass and cost in several power ranges. The bus capacitor is further coupled to a low-level voltage bus preferably located onto a motherboard located parallel to the high-level power bus. This low-level voltage bus forms a resonance compensation provision to damp the resonance between the decentralized bus capacitance and parasitic interconnection inductance. The compensation is further improved by an additional resistance ($R'_{board}$) and an additional inductor ($L'_{mod}$).

6 Claims, 2 Drawing Sheets

SPACECRAFT REGULATION UNIT WITH DECENTRALIZED BUS CAPACITANCE

The present invention relates to a Spacecraft Regulation Unit SRU comprising a plurality of power conversion modules adapted to be coupled via interconnection means to a power bus for supplying an adapted power level to equipment of a satellite.

Such a Spacecraft Regulation Unit SRU is already known in the art, e.g. from the SpaceBus 4000—Power Conditioning Unit "SB4-PCU" of Alcatel™. A Spacecraft Regulation Unit SRU is a Power Conditioning Unit PCU intended for Platform PF power in between 13 and 19 kW. The SRU is made of physical side by side power conversion modules, the number of which being determined by the unit power level. A power bus capacitors bank or module is provided for each predetermined set of power conversion modules. The SB4-PCU is thereby dimensioned (connections, battery charge, bus capacitor and the structure of the solar array regulation module) for the full power.

It is quite straightforward that the requested power bus capacitance for the sake of the bus voltage control is all the more large that the power level is high. At given electronic power conversion bandwidth indeed, larger busload transient necessitates larger bus capacitance for the bus voltage transient to be bounded.

However, in its low end, the known spacecraft regulation unit is not optimized for cases wherein not all the power conversion modules of a set are present, i.e. when the regulation unit is constituted by a reduced number of power conversion modules coupled to the power bus capacitors bank via the interconnection means and the power bus.

A power bus capacitors bank also generates a mass penalty for low power SRU as the bus capacitance is in that case sized for the largest power level. It is noted that an appropriation of the power bus capacitors bank would anyway be possible from one power level to another, but this is not a truly industrial solution and neither provides an optimized implementation volume.

More than ever, the telecom Geo satellites industry is facing a highly competitive market, where the technical and cost performances have to be improved constantly.

An object of the present invention is to provide a Spacecraft Regulation Unit SRU of the above known type but using an appropriate technology able to improve the competitiveness in term of mass and cost. The present SRU needs also to be very competitive from 6 to 13 kW, while keeping the possibility to cover the low-end range from 3 kW.

According to the invention, this object is achieved due to the fact that each of said power conversion modules is provided with a bus capacitor coupled via said interconnection means to said power bus.

In this way, a Spacecraft Regulation Unit SRU or Power Conditioning Unit PCU with decentralized capacitance is realized. By decentralized capacitance, it is meant that the power bus capacitors bank is distributed within the different power conversion modules, i.e. no longer implemented into a single dedicated module. This saves a specific power bus capacitors module and allows the bus capacitance to grow with the number of paralleled power conversion modules, thereby yielding a bus impedance all the more lower that the power level is high, as generally requested by control constraints.

Bus capacitance distribution into the power conversion modules is an elegant solution as the modular SRU is made of a module number all the more large that the power level increases. The unit would thereby contain a bus capacitance all the more large that the power level is high.

Along with the mass and volume bonus, the decentralized bus capacitance reduces the cost of both the development and the recurring manufacturing of the unit. Indeed, there is no longer any dedicated bus capacitance module to be considered.

An additional advantage is the improved EMC characteristic that a modular unit may feature when constituted with a decentralized bus capacitance. In that case indeed, each power conversion module has in its near vicinity a convenient capacitance level providing smoothing of the current waveforms before any circulation of the electrical power. This applies in particular for the known Sequential Switching Shunt Regulator S3R converter where large current steps must be dealt with at power bus level.

It is however to be noted that with the decentralized capacitance, parasitic resonance between module capacitance and interconnecting looming inductance may appear in some applications.

To prevent this, another characterizing embodiment of the present invention is that said bus capacitor is further coupled to a voltage bus located parallel to said power bus.

In this way, the resonance between distributed bus capacitance and parasitic inductance is damped by the creation of a voltage bus running parallel to the power bus.

In a preferred embodiment, the prevent invention is further characterized in that said power bus is a high-level power bus, and in that said voltage bus is a low-level voltage bus.

In this way, the above-mentioned damping of the resonance between distributed bus capacitance and parasitic inductance is achieved.

Also another characterizing embodiment of the present invention is that said bus capacitor and said voltage bus are coupled through a resistor, and that said bus capacitor and said power bus are coupled through an inductor.

The above decentralized bus capacitance is considered, now with convenient design provision from resonance viewpoint with parasitic inductance, where the capacitors are implemented within the power conversion modules. In this way, the problem of resonance between decentralized, i.e. distributed, bus capacitance and interconnection inductance, inside a modular power conditioning unit is solved. Adding a convenient inductor, e.g. 100 nH, and resistor, e.g. 10 mOhm, ensure damping of both the voltage bus and the power bus.

Again in a preferred embodiment, the prevent invention is further characterized in that said voltage bus is located onto a motherboard adapted to interconnect said power conversion modules.

The spacecraft regulation unit of the present invention is further also characterized in that said power conversion modules are build on distinct daughterboards located perpendicular to said voltage bus and to said power bus.

Preferably, said power bus and said voltage bus are substantially at a same voltage level, whilst the current flowing through said power bus is relatively much higher than the current flowing through said voltage bus.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 1 symbolically represents power bars and power conversion modules with bus capacitors ($C_{mod}$) as implemented in a Spacecraft Regulation Unit SRU according to the invention;

The baseline to supply satellite equipment is a full regulated power bus at 100V using solar array sources during sunlight periods and two Li-Ion batteries during eclipse periods. At lower power, however, a single battery could be used. This equipment is subdivided into different mechanical modules, permitting to build a Spacecraft Regulation Unit SRU or Power Conditioning Unit PCU taking into account the power demand.

Figure 1:
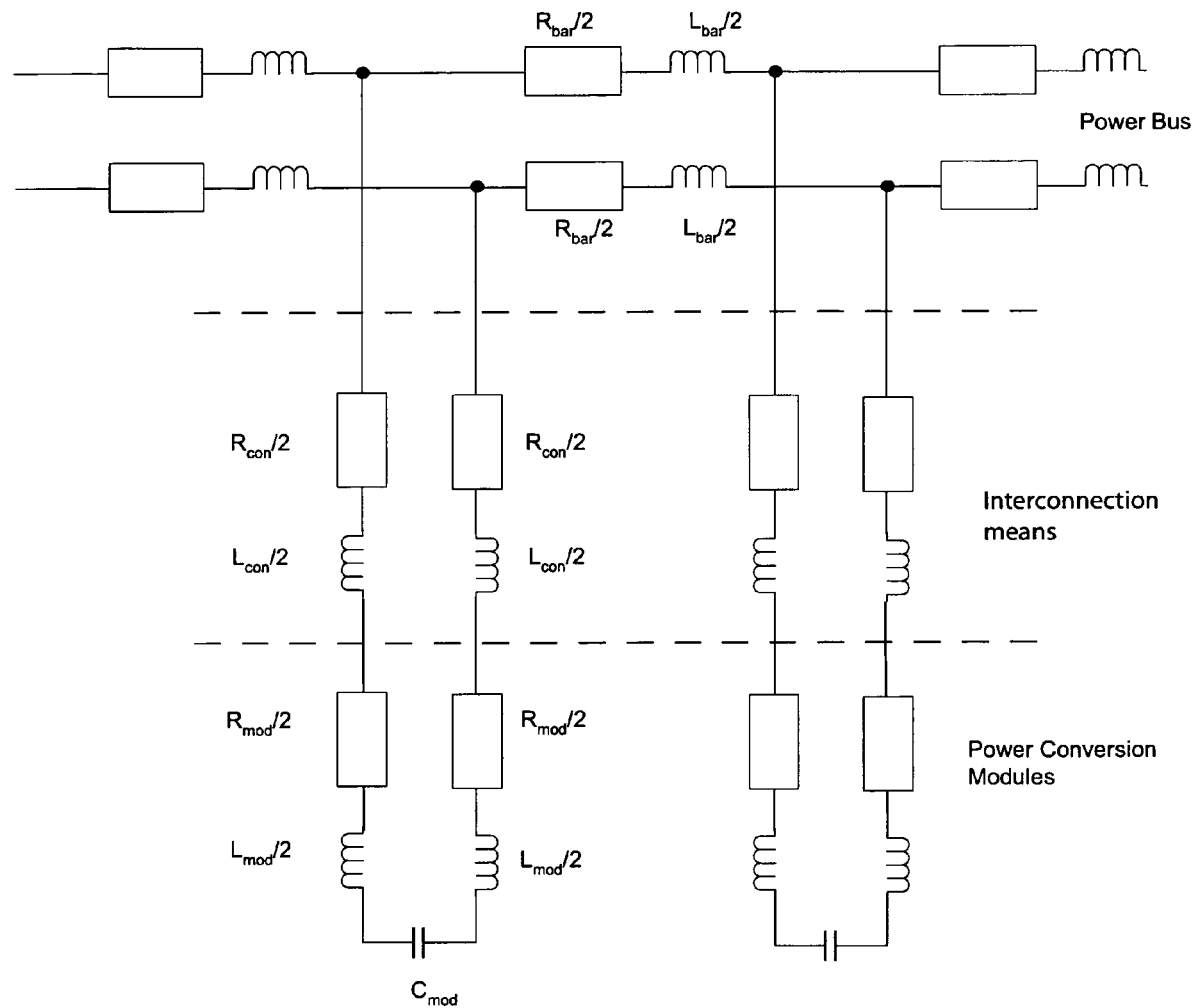

A bipolar model of a Spacecraft Regulation Unit SRU or Power Conditioning Unit PCU intended for Platform PF power in between 13 kW and 19 kW is represented at FIG. 1. The SRU is made of physical side by side power conversion modules, the number of which being determined by the unit power level. Each power conversion modules is build on a distinct "daughterboard" and is coupled, via interconnection means, to a high-level power bus constituted by power bars for supplying power to the equipment of the satellite. The parallel daughterboards are located perpendicular to the power bus as well as to a motherboard also used to interconnect the power conversion modules.

Each power conversion module is provided with a bus capacitor $C_{mod}$ coupled, via the interconnection means, to the high-level power bars of the power bus.

Since it is distributed within a number of different side-by-side physical power conversion modules, the bus capacitances constitute an electrical network. The SRU is defined as with decentralized capacitance. This means that the power bus capacitors bank, e.g. as used in the above-mentioned prior art, is now distributed within the different power conversion modules, i.e. is no longer implemented into a single dedicated module.

Hence, the question of parasitic resonance between module capacitance and interconnecting looming inductance is set.

The associated impedances are therefore carefully determined, based on a detailed implementation of the power bars by means of daughterboard or Printed Circuit Board PCB parameters, wires, copper or aluminum bars, and so on . . .

The resulting model is shown at FIG. 1. It corresponds to modules with a 150 µF level bus capacitance or bus capacitor $C_{mod}$ that each power conversion module connects to positive and return power bars forming the power bus. The bus capacitor $C_{mod}$ is implemented onto the PCB. The interconnections are ensured by means of copper, e.g. copper wires. Hence, the model contains resistance of the PCB tracks, of wires and of bars (both positive and return path), as well as associated inductance.

In more detail, the bus capacitor $C_{mod}$ is coupled to the positive and return power bars, i.e. to the power bus, via the serial connection of a first inductance $L_{mod}/2$ is series with a first resistance $R_{mod}/2$ representing a power conversion module and of a second inductance $L_{con}/2$ in series with a second resistance $R_{con}/2$ representing a interconnection means. These series connections are in parallel across the bus capacitor $C_{mod}$ since a bipolar model is considered here.

Between the connections of power conversion modules to the power bars, the series connection of third inductance $L_{bar}/2$ and third resistance $R_{bar}/2$ may be considered on each of the power bars.

Figure 2:
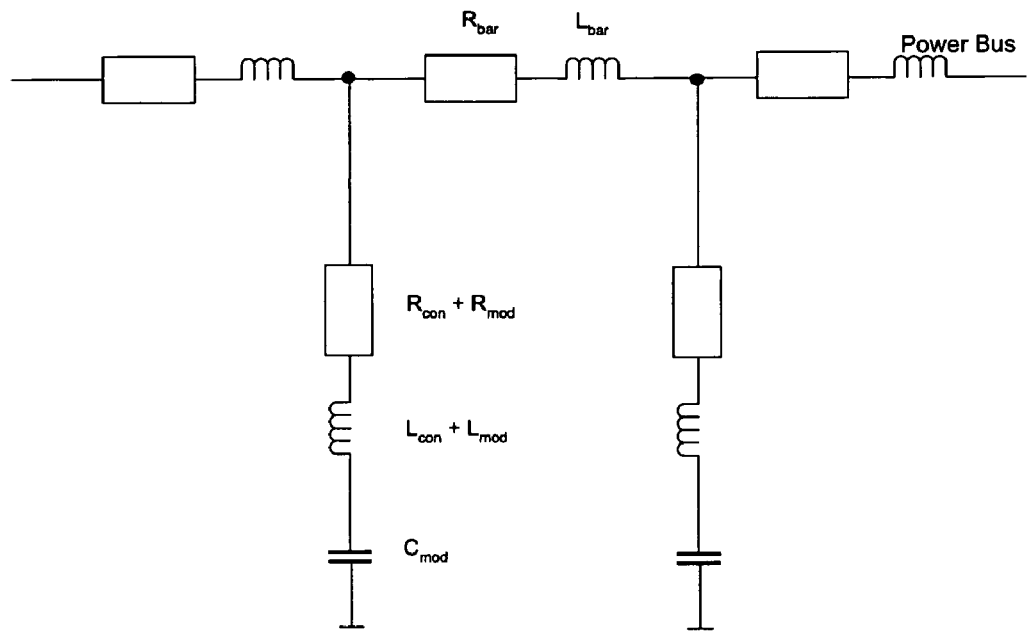
FIG. 2 is an unipolar model of the items of FIG. 1.

Before any further analysis, the bipolar model described above is first simplified into an equivalent unipolar model as represented at FIG. 2.

This will significantly ease the presentation of the subsequent rationale with no consequence on the final implementation of the compensation provision.

As a straightforward illustration, the case of (only) 2 power conversion modules will be considered here. Each module is represented by the bus capacitor $C_{mod}$ coupled to the power bus via the series connection of an inductance having the value $L_{con}+L_{mod}$ and a resistance having the value $R_{con}+R_{mod}$. Between the connections of the two modules to the power bus, appear the series connection of an inductance $L_{bar}$ and a resistance $R_{bar}$.

The equivalent network consists in a serial resonant RLC circuit with the following impedance figures, wherein the values of the elements are given as a practical example of implementation:

$$R_{ser} \approx 2R_{mod} \approx 2R_{con} \approx R_{bar} \approx 1,29\ m\Omega$$

$$L_{ser} \approx 2L_{mod} \approx 2L_{con} \approx L_{bar} \approx 56\ nH$$

$$C_{ser} \approx \frac{C_{mod}}{2} \approx 75\ \mu F$$

This leads to the next resonance frequency and characteristic impedance:

$$F_{res} \approx \frac{1}{2\pi}\sqrt{\frac{1}{LC}} \approx 78\ kHz$$

$$R_{char} \approx \sqrt{\frac{L}{C}} \approx 27\ m\Omega \gg R_{ser}$$

Clearly, with no specific provision, the resonance will not be damped by the line resistance. This is all the more critical that the standard power conversion switching frequency of 100 kHz may coincide with the resonance frequency, yielding unacceptable voltage transients.

In the previous paragraphs, the model of module capacitors connected to the power bus has been elaborated, and the resonant behavior has been pinpointed.

The problem of resonance between decentralized (i.e. distributed) bus capacitance and interconnection inductance, inside a modular power conditioning unit will be solved as explained below.

In the following paragraphs, a resonance compensation provision will be disclosed.

The basic idea to damp the resonance between distributed bus capacitance and parasitic inductance consists in creating a low-level voltage bus parallel to the power bus and preferably created at motherboard level, with convenient inductor $L'_{mod}$ (100 nH) and resistor $R'_{board}$ (10 mOhm) ensuring damping of both the power bus and the voltage bus on the motherboard, hereafter also called motherboard bus.

The resonance compensation provision thus consists in implementing a second voltage bus, parallel to the first one. The first bus is constituted by power bars (positive and return). The second bus will be constituted by copper plans (positive and return) within the motherboard.

The motherboard is located perpendicular to the daugtherboards including the power conversion modules with the purpose of providing a medium or low power connection mean between these different power conversion modules. The motherboard is parallel to the power bars which are intended to provide high power between the different modules. Although they are substantially at a same voltage level, a high power current, mainly DC, flows trough the power bus whilst a much lower current, mainly caused by transient voltage changes, flows through the voltage bus or motherboard bus.

Figure 3:
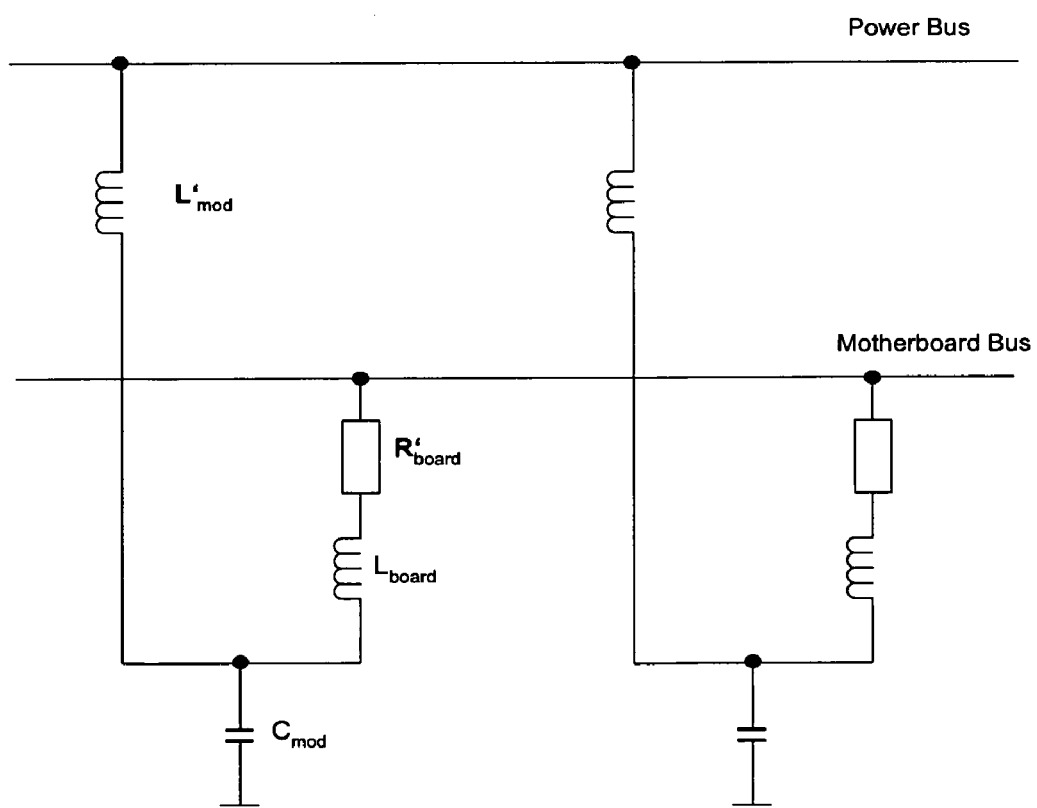
FIG. 3 is a unipolar model of the power bars and power conversion modules with capacitors resonance compensation provision ($R'_{board}$, $L'_{mod}$).

To prevent power current from circulating within the motherboard, some serial impedance is added at module level towards the motherboard copper plans. The corresponding (unipolar) model is displayed at FIG. 3.

The serial resistance $R_{board}$ at module level towards the motherboard bus clearly appears in series with the parasitic inductance $L_{board}$. This last component is mainly motivated (and sized) by the plug in connectors linking each module to the motherboard.

More in detail, a resistor is inserted, preferably on the motherboard, to form a resulting resistor $R'_{board}$ between the bus capacitor $C_{mod}$ and the voltage bus or motherboard bus, whilst an inductor is inserted to form a resulting inductor $L'_{mod}$ between the bus capacitor $C_{mod}$ and the power bus.

With respect to the power bus and module capacitors unipolar model shown at FIG. 2, a number of impedances have been neglected. This is justified as follows:

serial resistances $R_{mod}$ and $R_{con}$ are neglected as they will be significantly lower than the resulting resistance $R'_{board}$;

inductance $L_{con}$ is neglected with respect to resulting inductance $L'_{mod}$ as this last inductance will be purposely increased to a level significantly higher than the first one; and for similar reasons, serial resistance and inductance of both power bus and motherboard bus are negligible.

It is noted that a stabilization analysis of the constituted network and simulations with detailed impedance characteristics were performed to prove that the above approximations are relevant.

It is also to be noted that the stabilization condition of the network constituted for the sake of the resonance compensation is independent of the number of paralleled modules.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A Spacecraft Regulation Unit SRU comprising a plurality of power conversion modules adapted to be coupled via interconnection means to a power bus for supplying an adapted power level to equipment of a satellite, characterized in that each of said power conversion modules is provided with a bus capacitor ($C_{mod}$) coupled via said interconnection means to said power bus and also coupled to a voltage bus located parallel to said power bus.

2. The spacecraft regulation unit according to claim 1, characterized in that said power bus is a high-level power bus, and in that said voltage bus is a low-level voltage bus.

3. The spacecraft regulation unit according to claim 1, characterized in that said bus capacitor ($C_{mod}$) and said voltage bus are coupled through a resistor ($R'_{board}$), and in that said bus capacitor ($C_{mod}$) and said power bus are coupled through an inductor ($L'_{mod}$).

4. The spacecraft regulation unit according to claim 1, characterized in that said voltage bus is located onto a motherboard adapted to interconnect said power conversion modules.

5. The spacecraft regulation unit according to claim 1, characterized in that said power conversion modules are build on distinct daughterboards located perpendicular to said voltage bus and to said power bus.

6. The spacecraft regulation unit according to claim 2, characterized in that said power bus and said voltage bus are substantially at a same voltage level, and in that the current flowing through said power bus is relatively much higher than the current flowing through said voltage bus.

* * * * *